(12) United States Patent
Foss et al.

(10) Patent No.: US 9,902,306 B1
(45) Date of Patent: Feb. 27, 2018

(54) TAILGATE ASSEMBLY AND VEHICLE INCLUDING THE SAME

(71) Applicant: GM GLOBAL TECHNOLOGY OPERATIONS LLC, Detroit, MI (US)

(72) Inventors: John Foss, Troy, MI (US); David T. Renke, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/484,531

(22) Filed: Apr. 11, 2017

(51) Int. Cl.
- *B60P 1/43* (2006.01)
- *B62D 33/027* (2006.01)
- *B62D 33/03* (2006.01)
- *B62D 33/037* (2006.01)

(52) U.S. Cl.
CPC .......... *B60P 1/435* (2013.01); *B62D 33/0273* (2013.01); *B62D 33/03* (2013.01); *B62D 33/037* (2013.01)

(58) Field of Classification Search
CPC ..... B60P 1/435; B62D 33/0273; B62D 33/03; B62D 33/037
USPC ................................................. 296/61
See application file for complete search history.

(56) References Cited

U.S. PATENT DOCUMENTS

| | | | | |
|---|---|---|---|---|
| 5,244,335 A | * | 9/1993 | Johns | B60P 1/435 296/61 |
| 5,312,149 A | * | 5/1994 | Boone | B60P 1/435 296/61 |
| 5,536,058 A | * | 7/1996 | Otis | B60P 1/435 296/61 |
| 7,549,692 B2 | * | 6/2009 | Washington | B60P 1/435 296/61 |
| 9,067,525 B1 | | 6/2015 | Ninov et al. | |

\* cited by examiner

*Primary Examiner* — Joseph D. Pape
(74) *Attorney, Agent, or Firm* — Quinn IP Law

(57) ABSTRACT

A tailgate assembly includes a tailgate and a telescoping ramp movably coupled to the tailgate. The telescoping ramp is movable relative to the tailgate between a fully retracted position and a fully extended position. In the fully retracted position, the telescoping ramp is entirely disposed inside the tailgate. In the fully extended position, the telescoping ramp is at least partly disposed outside the tailgate.

18 Claims, 8 Drawing Sheets

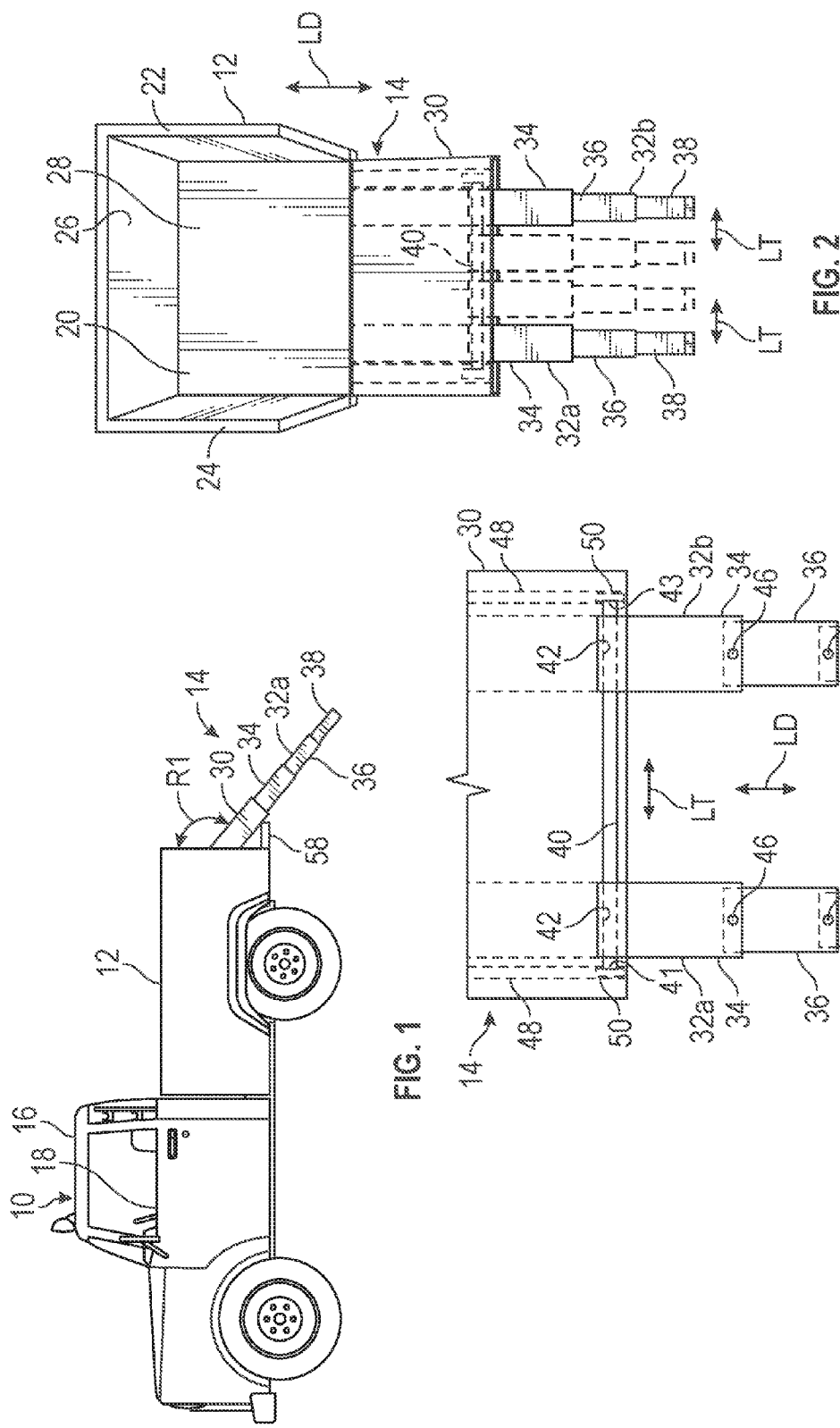

TAILGATE ASSEMBLY AND VEHICLE INCLUDING THE SAME

TECHNICAL FIELD

The present disclosure generally relates to a tailgate assembly and a vehicle including the same.

BACKGROUND

Pickup vehicle typically includes a truck bed. Cargo can be placed in the truck. The vehicle also includes a door, known as a tailgate, to access the truck bed.

SUMMARY

It is desirable to facilitate loading large objects (e.g., wood chipper, motorcycles, and all-terrain vehicles) into a truck bed of a vehicle. Specifically, it is desirable to provide vehicle operators with an assembly that allows a single user to singlehandedly load large and heavy objects into the truck bed. To this end, the present disclosure describes a tailgate assembly including telescoping ramps. The telescoping ramps of the presently disclosed tailgate assembly can be stowed inside a tailgate and, therefore, do not occupy space in the truck bed. Because the telescoping ramps can be stowed inside the tailgate, these telescoping ramps can be deployed even when the truck bed is fully loaded.

According to one aspect of the present disclosure, the tailgate assembly includes a tailgate and at least one telescoping ramp movably coupled to the tailgate. The telescoping ramp can move relative to the tailgate between a fully retracted position and a fully extended position. In the fully retracted position, the telescoping ramp is entirely disposed inside the tailgate. In the fully extended position, the telescoping ramp is at least partly disposed outside the tailgate. Instead of telescoping ramps, the tailgate assembly may include ramps which fold similar to a carpenters-type folding wood scale.

According to one aspect, the telescoping ramp may include a first telescoping segment, a second telescoping segment, and a third telescoping segment. The second telescoping segment is slidably coupled to the first telescoping segment, and the third telescoping segment is slidably coupled to the second telescoping segment. It is contemplated that the telescoping ramps may include more or fewer telescoping segments depending on the pickup bed height. For instance, the telescoping ramp may include a single segment. Alternatively, the telescoping ramp may include four or more telescoping segments.

According to one aspect, the tailgate assembly may further include a guide rod coupled to the tailgate. The telescoping ramp is movably coupled to the guide rod to allow the telescoping ramp to move relative to the tailgate along a lateral direction.

According to one aspect, the second telescoping segment is movably coupled to the first telescoping segment to allow the second telescoping segment to move relative to the first telescoping segment along a longitudinal direction. The longitudinal direction is perpendicular to the lateral direction.

According to one aspect, the tailgate may define an inner tailgate cavity. The tailgate assembly may further include a track disposed inside the inner tailgate cavity. The track extends along the longitudinal direction.

According to one aspect, the tailgate assembly may further include a guide roller coupled to the guide rod. The guide roller is sized to be movably disposed in the track to allow the guide rod to move along the longitudinal direction.

According to one aspect, the tailgate assembly may further include a door movably coupled to the tailgate. As such, the door can move relative to the tailgate between a closed position and an open position. When the door is the open position, the telescoping ramp is accessible.

According to one aspect, the tailgate assembly may further include a locking assembly coupled to the door. The locking assembly is configured to lock the door relative to the tailgate in the closed position. The locking assembly includes a tab movably coupled to the door. As such, the tab can move relative to the door between a locked position and an unlocked position.

According to one aspect, the door may define a slot. The tailgate assembly may further include a ramp hook coupled to the telescoping ramp. The ramp hook is sized to be received in the slot. Alternatively, the tailgate assembly may include bumps instead of slots.

According to one aspect, the tailgate assembly may further include a bump coupled to the tailgate and a ramp hook coupled to the telescoping ramp. The ramp hook is configured to engage the bump when the telescoping ramp is outside the tailgate.

The present disclosure also describes vehicles including a truck bed and the tailgate assembly described above. The tailgate of the tailgate assembly is movably coupled to the truck bed.

According to one aspect, the tailgate is pivotally coupled to the truck bed. Thus, the tailgate can pivot about a first pivot axis. The vehicle may further include a hinge assembly coupled between the truck bed and the tailgate to allow the tailgate to pivot relative to the truck bed about a second pivot axis. The second pivot axis is spaced apart from the first pivot axis along a longitudinal direction.

According to one aspect, the hinge assembly includes a bar coupled between the truck bed and the tailgate. A first pivot pin directly couples the bar to the truck bed. A second pivot pin directly couples the bar to the tailgate.

According to one aspect, the hinge assembly may further include a catch directly coupled to the tailgate. The catch defines an open cavity sized to receive the bar.

According to one aspect, the hinge assembly may further include a locking pin removably coupled to the catch and the bar. The catch may define a catch hole sized to receive the locking pin. The tailgate is movable along the longitudinal direction when the locking pin is decoupled from the catch and the bar. The tailgate is pivotable about the second pivot axis when the locking pin is decoupled from the catch and the bar.

According to one aspect, the vehicle may further include a winch assembly coupled to the truck bed. The winch assembly includes a spool and a cable configured to be wrapped round the spool.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, side view of a vehicle including a truck bed and a tailgate assembly.

FIG. 2 is a schematic, top view of the truck bed and the tailgate assembly of the vehicle shown in FIG. 1.

FIG. 3 is a schematic, fragmentary, top view of the truck bed and telescoping ramps of the tailgate assembly shown in FIG. 2, wherein the telescoping ramps are in a fully extended position.

DETAILED DESCRIPTION

Figure 4:
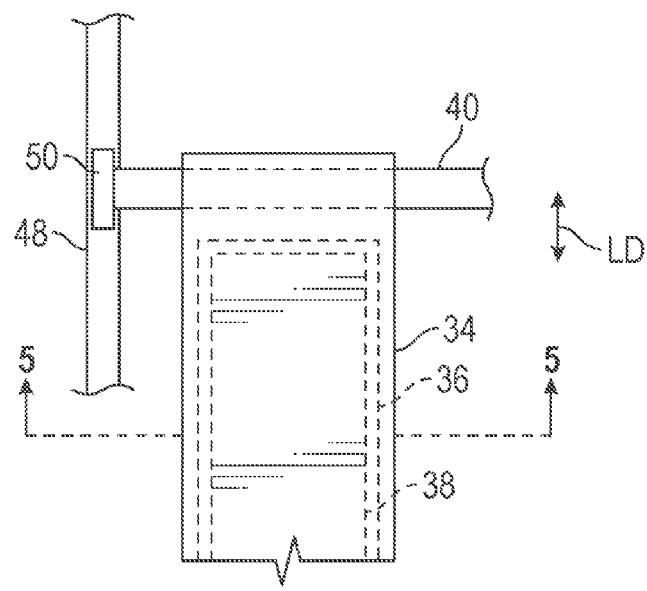
FIG. 4 is a schematic, fragmentary, top view of a telescoping ramp and a guide rod of the tailgate assembly shown in FIG. 2, wherein the telescoping ramp is in a fully retracted position.

Referring to the drawings, wherein like reference numbers correspond to like or similar components throughout the several figures, and beginning with FIGS. 1 and 2, a vehicle 10 includes a truck bed 12 and a tailgate assembly 14 movably coupled to the truck bed 12. Accordingly, the vehicle 10 may be a pickup truck. It is contemplated however, that the vehicle 10 may be other kinds of vehicles or equipment, such as agricultural equipment.

The vehicle 10 includes a vehicle body 16 defining a passenger compartment 18. The truck bed 12 defines a cargo compartment 20. In the depicted embodiment, the cargo compartment 20 is an open cavity. The truck bed 12 includes a first sidewall 22 and a second sidewall 24 spaced from the first sidewall 22 along a lateral direction L. The first sidewall 22 and the second sidewall 24 may be parallel to each other to enhance the structural integrity of the truck bed 12. The truck bed 12 further includes a support wall 26, which is the part of the truck bed 12 that is closest to the passenger compartment 18. The tailgate assembly 14 is spaced apart from the support wall 26 along a longitudinal direction LD. The longitudinal direction LD is perpendicular to the lateral direction LT. The truck bed 12 additionally includes a support floor 28 interconnecting the support wall 26, the first sidewall 22, the second sidewall 24, and the tailgate assembly 14. The tailgate assembly 14, the support wall 26, the support floor 28, the first sidewall 22, and the second sidewall 24 collectively define the cargo compartment 20.

The tailgate assembly 14 is movably coupled to the truck bed 12. For example, the tailgate assembly 14 may be pivotally coupled to the truck bed 12. As such, the tailgate assembly 14 can pivot relative to the truck bed 12 (in the rotational direction indicated by double arrow R1) between an open position and a closed position. As a non-limiting example, the tailgate assembly 14 may be pivotally (and directly) coupled to the support floor 28 of the truck bed 12.

The tailgate assembly 14 includes a tailgate 30 movably coupled to the truck bed 12. In addition to the tailgate 30, the tailgate assembly 14 includes one or more telescoping ramps 32a, 32b movably coupled to the tailgate 30. As a non-limiting example, the tailgate assembly 14 may include only two telescoping ramps 32a, 32b in order to maximize the loading capabilities of the tailgate assembly 14 while minimizing part count. It is contemplated, however, that the tailgate assembly 14 may only include one telescoping ramp 32a. The telescoping ramp 32a may be referred to as the first telescoping ramp, and the telescoping ramp 32b may be referred to as the second telescoping ramp 32b. The telescoping ramps 32a, 32b may identical to each other to facilitate manufacturing.

Each of the telescoping ramps 32a, 32b is movable relative to the tailgate 30 between a fully retracted position (shown in hidden lines in FIG. 2) and a fully extended position (shown in solid lines in FIGS. 1 and 2). In the fully retracted position, each of the telescoping ramps 32a, 32b may be entirely positioned inside the tailgate 30 to facilitate handling the tailgate 30. In other words, because the telescoping ramps 32a, 32b are entirely disposed inside the tailgate 30, it is easier to move the tailgate 30 relative to the truck bed 12 between the open position and the closed position. In the fully extended position, each of the telescoping ramps 32a, 32b may be at least partially disposed outside the tailgate 30 to allow a user to load objects into the truck bed 12.

With reference to FIGS. 3-6, each of the telescoping ramps 32a, 32b includes a first telescoping segment 34, a second telescoping segment 36, and a third telescoping segment 38. The second telescoping segment 36 is slidably coupled to the first telescoping segment 36, and the third telescoping segment 38 is slidably coupled to the second telescoping segment 36 to allow the each of the telescoping ramps 32a, 32b to move between the fully retracted position and the fully extended position. As non-limiting example, each of the telescoping ramps 32a, 32b may only include three telescoping segments (i.e., only the first telescoping segment 34, the second telescoping segment 36, and the third telescoping segment 38) in order to enhance the structural integrity of the telescoping ramps 32a, 32b while minimizing part count.

Each of the first telescoping segment 34, the second telescoping segment 36, and the third telescoping segment 38 have different maximum widths to facilitate the telescoping motion of the telescoping ramp 32a (or 32b) between the fully retracted position and the fully extended position. Specifically, the maximum width W1 of the first telescoping segment 34 is greater than the maximum width W2 of the second telescoping segment 36, and the maximum width W2 of the second telescoping segment 36 is greater than the maximum telescoping width W3 of the third telescoping segment 38. Due to these dimensional differences, the second telescoping segment 36 can be slidably coupled to the first telescoping segment 34, and the third telescoping segment 38 can be slidably coupled to the second telescoping segment 36. In particular, the second telescoping segment 36 is movably coupled to the first telescoping segment 34 to allow the second telescoping segment 36 to move relative to the first telescoping segment 34 along the longitudinal direction LD, and the third telescoping segment 38 is movably coupled to the second telescoping segment 36 to allow the third telescoping segment 38 to move relative to the second telescoping segment 36 in the longitudinal direction LD. As discussed above, the longitudinal direction LD is perpendicular to the lateral direction LT.

The tailgate assembly 14 further includes a guide rod 40 movably coupled to the tailgate 30. Each of the telescoping ramps 32a, 32b can be movably coupled to the guide rod 40 to allow the telescoping ramps 32a, 32b to move relative to the tailgate 30 along the lateral direction LT. The guide rod 40 is fixed to the tailgate 30 along the lateral direction LT and has a first rod end 41 and a second rod end 43 opposite the first rod end 41. Moreover, the guide rod 40 remains stationary relative to the tailgate 30 along the lateral direction LT. As a result, the guide rod 40 can guide the lateral movement of the telescoping ramps 32a, 32b along the lateral direction LT. Specifically, the first telescoping segment 34 of each telescoping ramp 32a, 32b is directly (and slidably) coupled to the guide rod 40. To this end, the first telescoping segment 34 of each telescoping ramp 32a, 32b defines a rod-receiving opening 42. In the depicted embodiment, the rod-receiving opening 42 is a thru-hole extending through the first telescoping segment 34. Therefore, the guide rod 40 extends through the rod-receiving opening 42 of the first telescoping segment 34. As a consequence, the telescoping ramps 32a, 32b can move along the lateral direction LT (away from or towards each other). It is desirable to adjust the lateral position of the telescoping ramps 32a, 32b to facilitate loading cargos having different sizes into the truck bed 12.

As discussed above, when disposed in the fully extended position, the telescoping ramps 32a, 32b are at least partly disposed outside the tailgate 30, thereby allowing a user to employ the telescoping ramps 32a, 32b to load cargo into the truck bed 12. To enhance the structurally integrity of the telescoping ramps 32a, 32b when disposed in the fully extended position, the tailgate assembly 14 may include locking ramp pins 46. As a non-limiting example, one or more locking ramp pins 46 may be removably coupled between the first telescoping segment 34 and the second telescoping segment 36 when the telescoping ramp 32a (or 32b) is in the fully extended position to inhibit the retraction of the telescoping ramp 32a (or 32b). As a non-limiting example, another locking ramp pin 46 may be removably coupled between the second telescoping segment 36 and the third telescoping segment 38 when the telescoping ramp 32a (or 32b) is in the fully extended position to inhibit the retraction of the telescoping ramp 32a (or 32b).

The tailgate assembly 14 further includes at least one track 48 disposed inside the inner tailgate cavity 44. In the depicted embodiment, the tailgate assembly 14 includes two tracks 48 to enhance the stability of the telescoping ramps 32a, 32b. The tracks 48 are coupled to the tailgate 30 and extend along the longitudinal direction LD. Thus, the tracks 48 may each be elongated along the longitudinal direction LD to guide the movement of the telescoping ramps 32a, 32b along the longitudinal direction LD. The tailgate assembly 14 includes at least one guide roller 50 coupled to the guide rod 40. As a non-limiting example, the tailgate assembly 14 includes two guide rollers 50. One guide roller 50 is directly coupled to the first rod end 41 of the guide rod 40, and another guide roller 50 is directly coupled to the second rod end 43 of the guide rod 40 to enhance the structural integrity of the tailgate assembly 14. Each guide roller 50 is configured, sized, and shaped to be movably disposed in the track 48 to allow the guide rod 40 to move along the longitudinal direction LD. Consequently, the guide rollers 50 can roll within the tracks 48 to guide the movement of the telescoping ramps 32a, 32b in the longitudinal direction LD.

Figure 5:
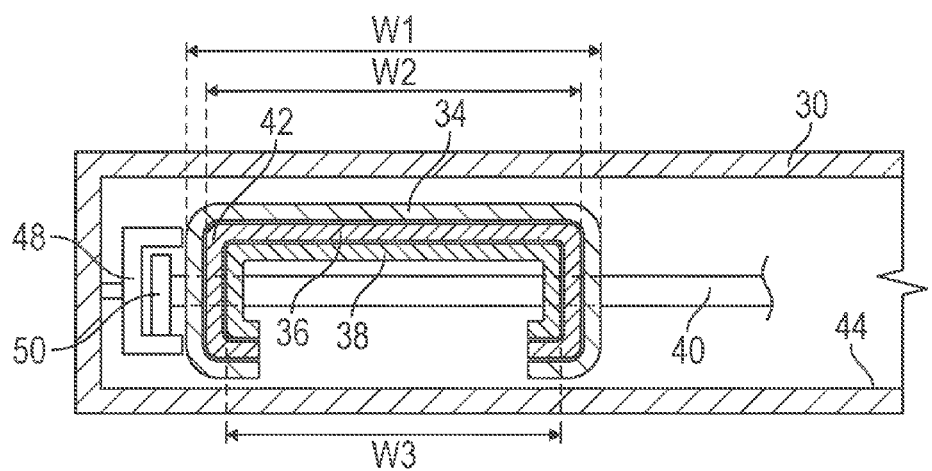
FIG. 5 is a schematic, cross-sectional view of the telescoping ramp and the guide rod shown in FIG. 4, taken along section line 5-5.
Figure 6:
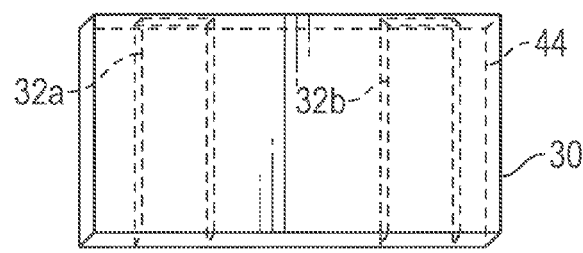
FIG. 6 is a schematic, perspective view of the tailgate of the tailgate assembly shown in FIG. 1, wherein the telescoping ramps are shown (in hidden lines) entirely disposed inside in the tailgate and in the fully retracted position.

With reference to FIGS. 5 and 6, the tailgate 30 defines an inner tailgate cavity 44 configured, shaped, and sized to receive the telescoping ramps 32a, 32b in the fully retracted position. For example, in the fully retracted position, the telescoping ramps 32a, 32b are entirely disposed inside the tailgate 30. Thus, no portion of the telescoping ramps 32a, 32b is disposed outside the tailgate 30 when the telescoping ramps 32a, 32b are in the fully retracted position. As a result, the telescoping ramps 32a, 32b do not interfere with the handling of the tailgate 30 when disposed in the fully retracted position.

Figure 7A:
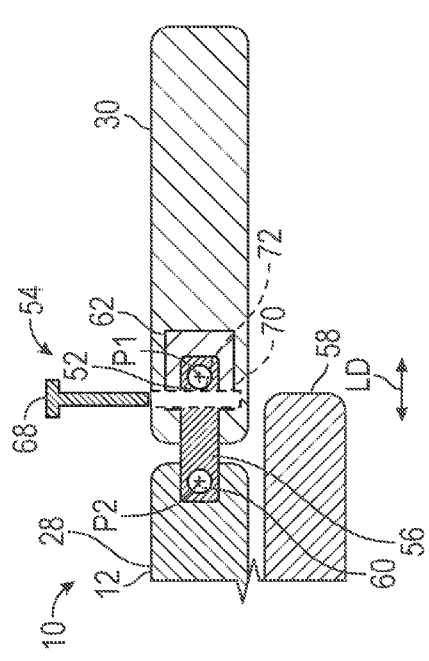
FIGS. 7A-7D are schematic, cross-sectional views of a hinge assembly of the vehicle shown in FIG. 1, depicting the tailgate in different positions.
Figure 7B:
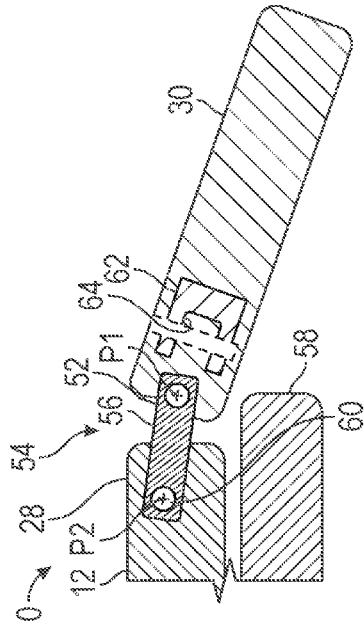
Figure 7C:
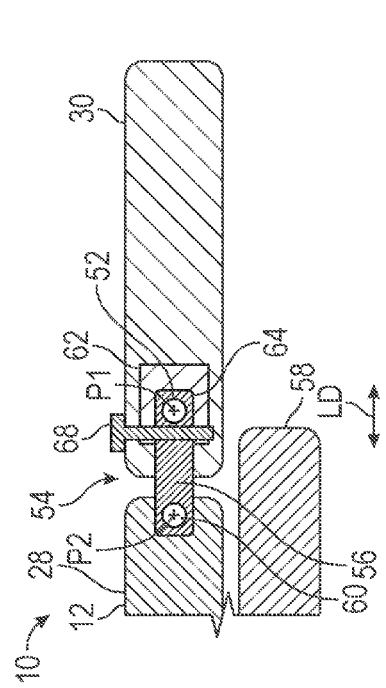
Figure 7D:
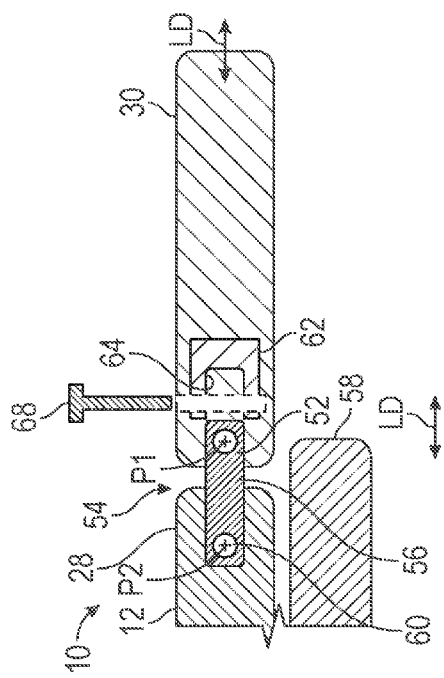

With reference to FIGS. 7A-7D, as discussed above, the tailgate 30 is pivotally coupled to the truck bed 12. As such, the tailgate 30 can pivot about a first pivot axis P1. To do so, a first pivot pin 52 can pivotally couple the tailgate 30 to the truck bed 12. The vehicle 10 further includes a hinge assembly 54 coupled between the truck bed 12 and the tailgate 30. The hinge assembly 54 allows the tailgate 30 to pivot relative to the truck bed 12 about a second pivot axis P2 in order to clear the rear bumper 58 of the vehicle 10 when the tailgate 30 is in the hyperextended position as shown in FIG. 7D. The second pivot axis P2 is spaced apart from the first pivot axis P1 along the longitudinal direction LD.

The hinge assembly 54 includes a bar 56 coupled between the truck bed 12 and the tailgate 30. The first pivot pin 52 directly (and pivotally) coupling the bar 56 to the truck bed 12. Accordingly, the tailgate 30 can pivot about the first pivot pin 52. The hinge assembly 54 also includes a second pivot pin 60 directly (and pivotally) coupling the bar 56 to the tailgate 30. As discussed below, the tailgate 30 can also pivot relative to the truck bed 12 about the second pivot pin 60. The hinge assembly 54 further includes a catch 62 directly coupled to the tailgate 30. The catch 62 defines an open cavity 64 configured, shaped and sized to receive the bar 56. The hinge assembly 54 further includes a locking pin 68 removably coupled to the catch 62 and the bar 56. The catch 62 defines a catch hole 70 (e.g., a thru-hole), and the bar 56 defines a bar hole 72 (e.g., a thru-hole). When the bar 56 is partly disposed in the open cavity 64 of the catch 62, the bar hole 72 and the catch hole 70 are substantially aligned with one another to receive the locking pin 68. Thus, each of the bar hole 72 and the catch hole 70 are configured, shaped, and sized to receive the locking pin 68. Thus, the locking pin 68 interconnects the tailgate 30, the catch 62, and the bar 56 when disposed in the bar hole 72 and the catch hole 70 as shown in FIG. 7A. As a consequence, the tailgate 30 can pivot about the first pivot axis P1 (i.e., about the first pivot pin 52) when the locking pin 68 is positioned in the catch hole 70 and the bar hole 72. As a non-limiting example, the tailgate 30 can pivot about the first pivot axis P1 (i.e., about the first pivot pin 52) only when the locking pin 68 is positioned in the catch hole 70 and the bar hole 72. The tailgate 30 cannot pivot about the first pivot axis P1 (i.e., about the first pivot pin 52) when the locking pin 68 is positioned in the catch hole 70 and the bar hole 72.

The locking pin 68 can be removed from the bar hole 72 and the catch hole 70 to decouple the bar 56 from the catch 62 as shown in FIG. 7B. When the locking pin 68 is removed from the bar hole 72 and the catch hole 70 (and therefore decouple from the catch 62 and the bar 56), the tailgate 30 can move relative to the truck bed 12 along the longitudinal direction LD as shown in FIG. 7C. As such, the tailgate 30 can move in the longitudinal direction LD (toward and away from the truck bed 12) when the locking pin 68 is decoupled from the bar 56 and the catch 62. The tailgate 30 cannot move relative to the truck bed 12 along the longitudinal direction LD when the locking pin 68 is positioned in the catch hole 70 and the bar hole 72. As a non-limiting example, the tailgate 30 can move relative to the truck bed 12 in the longitudinal direction LD only when the locking pin 68 is decoupled from the catch 62 and the bar 56 in order to enhance the structural integrity of the hinge assembly 54.

Once the locking pin 68 is decoupled from the catch 62 and the bar 56, the tailgate 30 can be moved in the longitudinal direction LD away from the truck bed 12. Then, the tailgate 30 can pivot relative to the truck bed 12 about the second pivot axis P2. In other words, the tailgate 30 can pivot about the second pivot axis P2 (i.e., about the second pivot pin 60) when the locking pin 68 is decoupled from the catch 62 and the bar 56. As a non-limiting example, the tailgate 30 can pivot about the second pivot axis P2 (i.e., about the second pivot pin 60) only when the locking pin 68 is decoupled from the catch 62 and the bar 56. As a non-limiting example, the tailgate 30 can pivot about both the first pivot axis P1 (i.e., about the first pivot pin 52) and the second pivot axis P2 (i.e., about the second pivot pin 60) only when the locking pin 68 is decoupled from the catch 62 and the bar 56, thereby allowing the tailgate 30 to move relative to the truck bed 12 to a hyperextended position as shown in FIG. 7D in order to clear the rear bumper 58 of the vehicle 10. In other words, the hinge assembly 54 allows the tailgate 30 to move relative to the truck bed 12 between the open position (shown in FIG. 7A) to the hyperextended position (shown in FIG. 7D).

Figure 8:
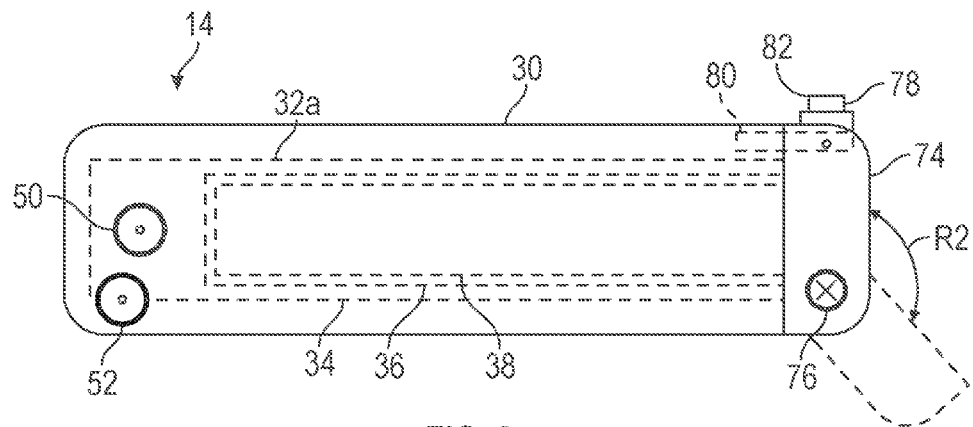
FIG. 8 is a schematic, side view of the tailgate assembly shown in FIG. 1, depicting a door.
Figure 9:
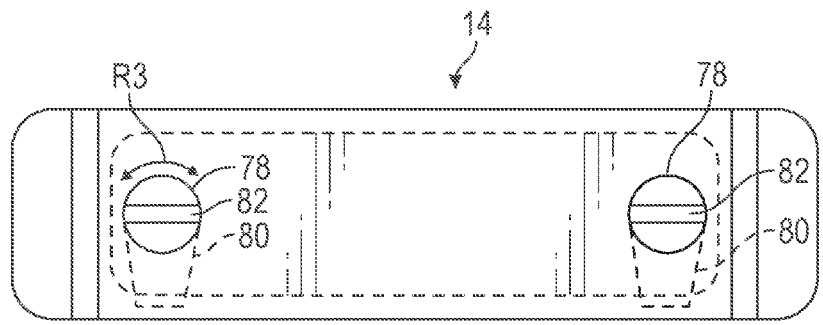
FIG. 9 is a schematic, top view of the tailgate assembly shown in FIG. 1, depicting a locking assembly.

With reference to FIG. 8, the tailgate assembly 14 further includes a door 74 movably coupled to the tailgate 30. As such, the door 74 can move (e.g., pivot) relative to the tailgate 30 between a closed position (shown in solid lines) and an open position (shown in dashed lines). When the door 74 is the open position, the telescoping ramps 32a, 32b are accessible. As a non-limiting example, a third pivot pin 76 can pivotally couple the door 74 to the tailgate 30. Accordingly, the door 74 can pivot relative to the tailgate 30 about the third pivot pin 76 in the direction indicated by double arrow R2.

Figures 10, 11:
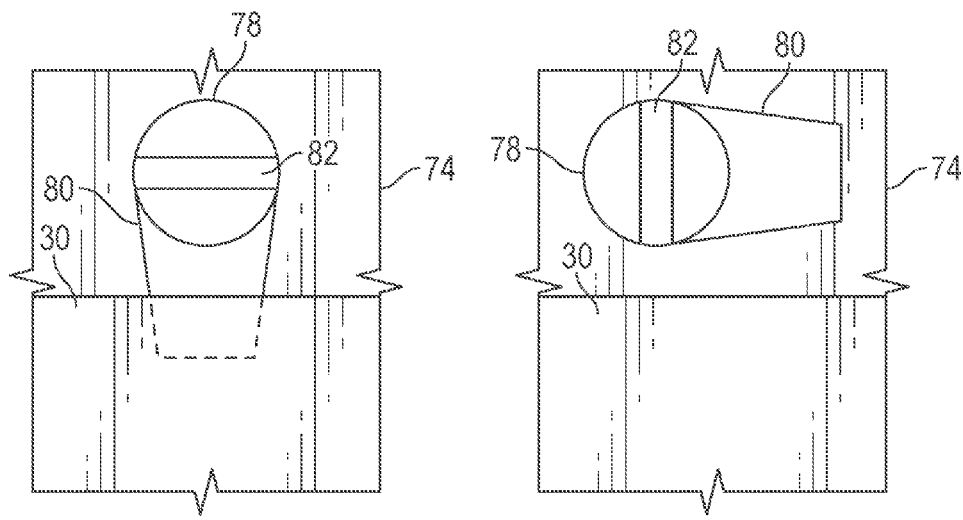
FIG. 10 is a schematic, top view of a locking assembly of the tailgate assembly shown in FIG. 1 in the locked position.
FIG. 11 is a schematic, top view of the locking assembly shown in FIG. 10 in the unlocked position.

With reference to FIGS. 9-12, the tailgate assembly 14 further includes a locking assembly 78 coupled to the door 74. The locking assembly 78 can lock the door 74 relative to the tailgate 30 in the closed position. The locking assembly 78 includes a tab 80 and a knob 82 coupled to the tab 80. The tab 80 is movably coupled to the door 74. As such, the tab 80 can move (e.g., rotate) relative to the door 74 between a locked position (FIG. 10) and an unlocked position (FIG. 11). As a non-limiting example, the tab 80 is rotationally coupled to the door 74. Therefore, the tab 80 can rotate relative to the door 74 in the direction indicated by double arrow R3. A user may manipulate the tab 80 through the knob 82. In the locked position, the tab 80 extends between the tailgate 30 and the door 74, thereby precluding the door 74 from moving from the closed position to the open position. In the unlocked position, the entire tab 80 is disposed inside the door 74 and, therefore, does not prevent the door 74 from moving from the closed position to the open position.

Figure 12:
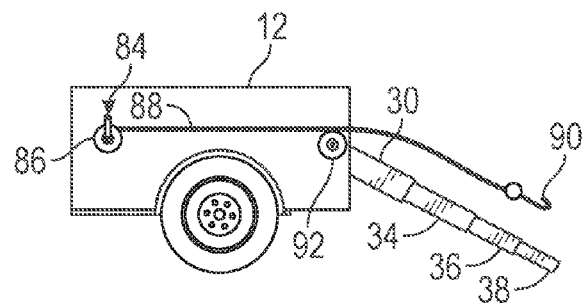
FIG. 12 is a schematic, side, fragmentary view of the vehicle shown in FIG. 1, depicting a winch mechanism.

With reference to FIG. 12, the vehicle 10 further includes a winch assembly 84 coupled to the truck bed 12. The winch assembly 84 includes a spool 86 and a cable 88 configured to be wrapped round the spool 86. The spool 86 is coupled to the truck bed 12. The spool 86 can be spun to wind the cable 88. A loading hook 90 can be coupled to the end of the cable 88 to facilitate loading cargo into the truck bed 12. The vehicle 10 further includes a wear roller 92 adjacent the tailgate 30 to minimize wear in the cable 88. The wear roller 92 is coupled to the truck bed 12 and can spin and contact the cable 88 to facilitate movement of the cable 88.

Figure 13:
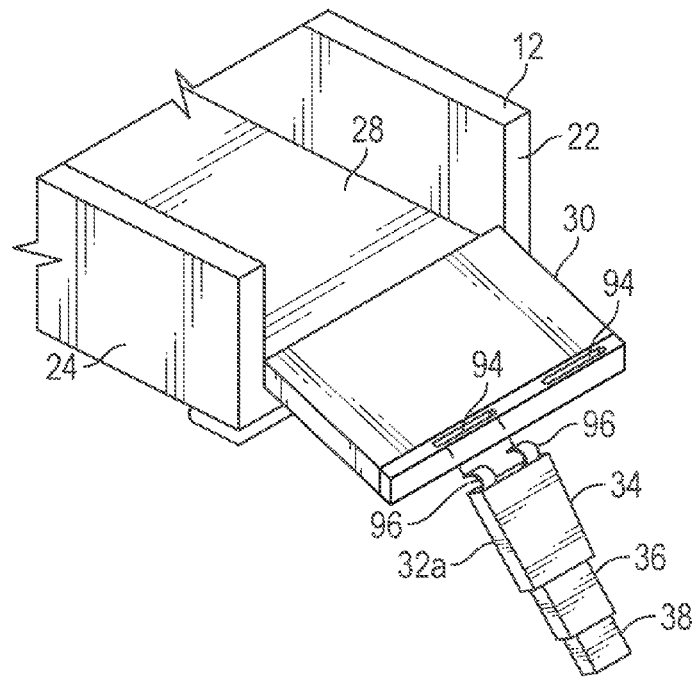
FIG. 13 is a schematic, perspective, exploded view of a tailgate assembly and a truck bed, including ramp hooks and slots in the tailgate.
Figure 14:
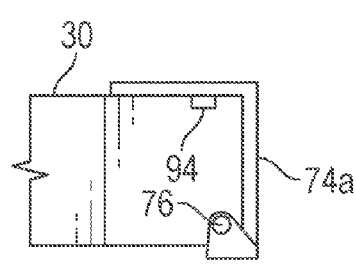
FIG. 14 is a schematic, side view of the tailgate shown in FIG. 13 and the door covering the slots shown in FIG. 13.
Figure 15:
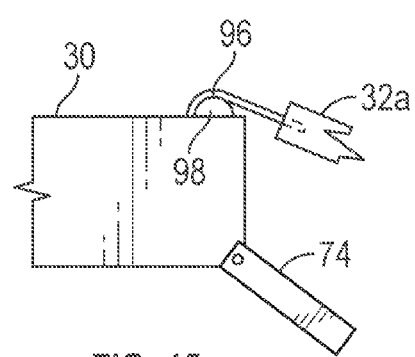
FIG. 15 is a schematic, side view of a tailgate including a bump, wherein the ramp hooks are coupled to the bump.

With reference to FIGS. 13 and 14, according to another aspect of the present disclosure, the tailgate 30 may include one or more slots 94. The telescoping ramps 32a (and/or 32b) may additionally include ramp hooks 96 directly coupled to the first telescoping segment 34. Each slot 94 is configured, shaped, and sized to receive the ramp hooks 96 in order to couple the telescoping ramps 32a (and/or 32b) to the tailgate 30. In other words, each ramp hook 96 is configured, shaped, and sized to be received in one of the slots 94. The door 74a may have a substantially L-shape to cover the slots 94 when it is in the closed position as shown in FIG. 14. As shown in FIG. 15, the slots 94 may be replaced with bumps 98 to allow the telescoping ramps 32a and 32b to engage the tailgate 30 via the bumps 98. Initially, the telescoping ramps 32a (and/or 32b) may be disposed inside the tailgate 30. Specifically, the telescoping ramps telescoping ramps 32a (and/or 32b) may be disposed entirely disposed inside the inner tailgate cavity 44 (FIG. 6). As a non-limiting example, the tailgate 30 may include one or more tracks 48 (FIG. 5) to allow longitudinal movement of the telescoping ramps 32a (and/or 32b). The telescoping ramps 32a (and/or 32b) can be fully removed from the tailgate 30 through the door 74 (FIG. 8) when the door 74 is in the open position. Then, ramp hooks 96 can be disposed inside the slots 94 to couple the telescoping ramps 32a (and/or 32b) to the tailgate 30.

With reference to FIG. 15, the vehicle 10 may include one or more bumps 98 coupled to the tailgate 30. As a non-limiting example, the bump 98 may protrude directly from the tailgate 30 to enhance the structural assembly of the tailgate assembly 14. The ramp hook 96 can engage the bump 98 when the telescoping ramp 32a (and/or 32b) is outside the tailgate 30 in order to couple the tailgate 30 to the telescoping ramp 32a (and/or 32b).

Figure 16:
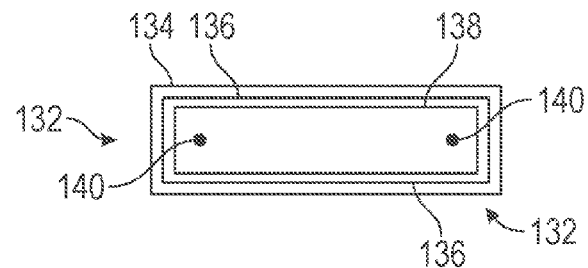
FIG. 16 is a schematic, side view of ramps which fold similar to a carpenters-type folding wood scale shown in a retracted state.
Figure 17:
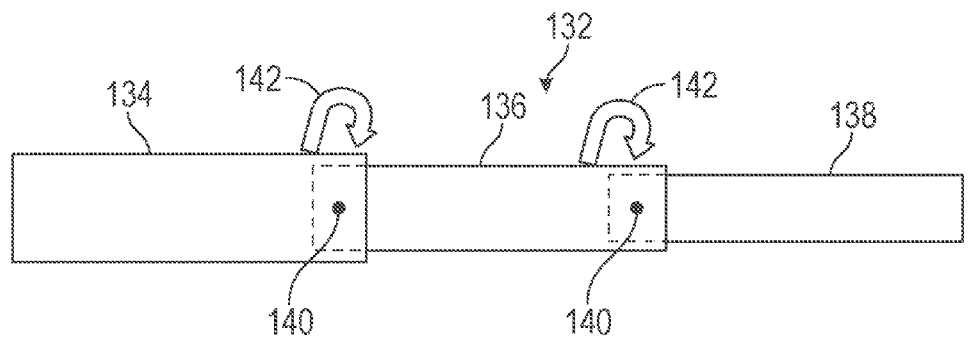
FIG. 17 is a schematic, side view of the ramps which fold similar to a carpenters-type folding wood scale shown in FIG. 16, wherein the ramps which fold similar to a carpenters-type folding wood scale are shown in an extended position.
Figure 18:
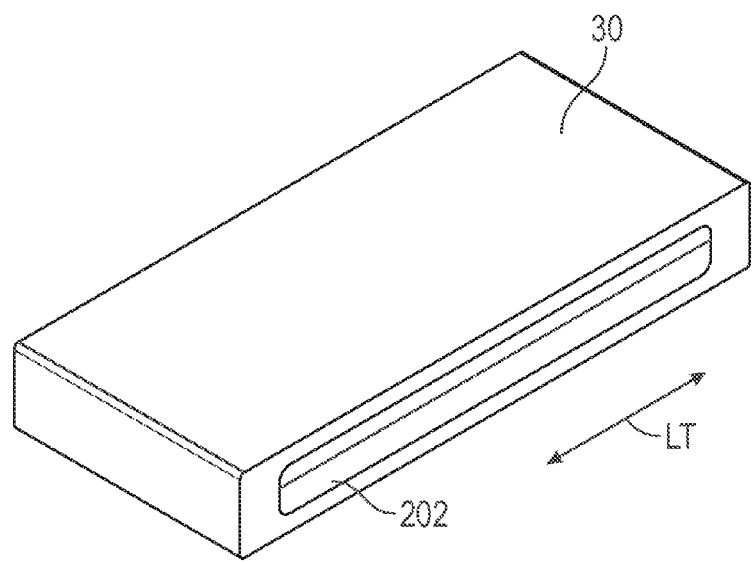
FIG. 18 is a schematic, perspective, fragmentary view of a tailgate of a tailgate assembly according to another aspect of the present disclosure, wherein the tailgate has a laterally-extending track to facilitate cross-car movement of the telescoping ramps.
Figure 19:
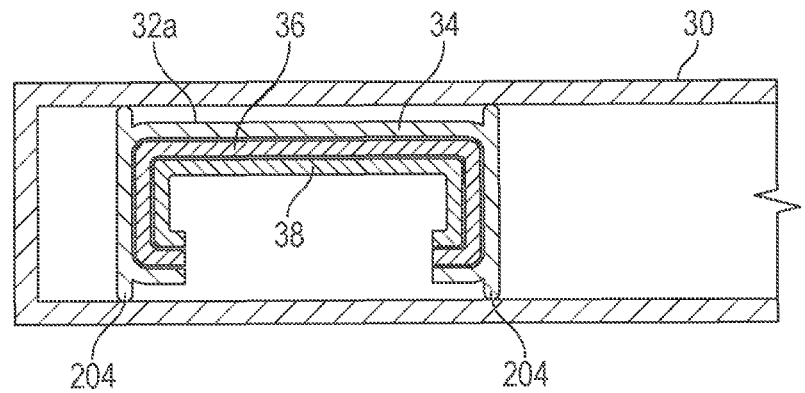
FIG. 19 is a schematic, cross-sectional view of the tailgate shown in FIG. 18 and the telescoping ramps.
Figure 20:
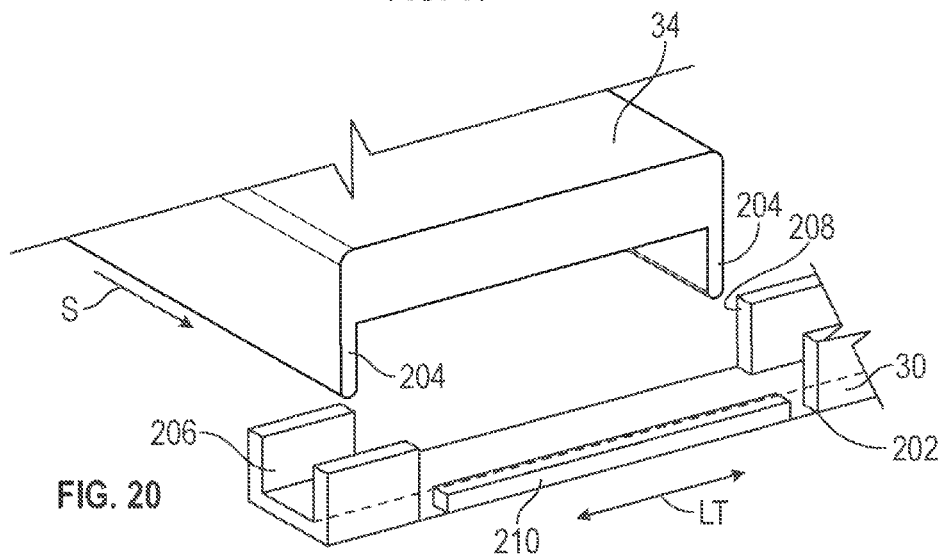
FIG. 20 is a schematic, perspective, fragmentary, cutaway view of the tailgate and one of the telescoping ramps shown in FIG. 18.
Figure 21:
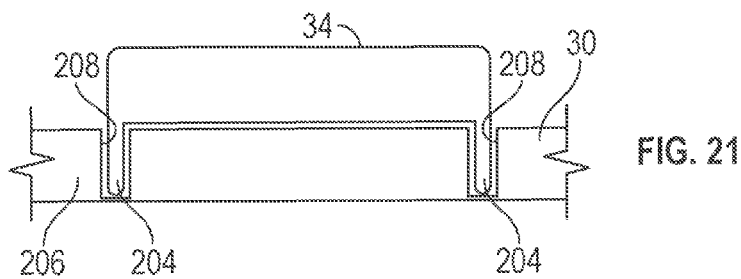
FIG. 21 is a schematic, perspective, fragmentary, cutaway view of the tailgate and one of the telescoping ramps shown in FIG. 18, wherein the telescoping ramps has protrusions, and the protrusions are disposed outside of the laterally-extending track.
Figure 22:
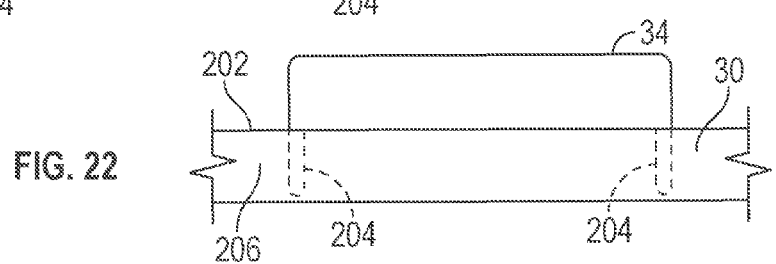
FIG. 22 is a schematic, perspective, fragmentary, cutaway view of the tailgate and one of the telescoping ramps shown in FIG. 18, wherein the protrusions of the telescoping ramp are disposed inside of the laterally-extending track.
Figure 23:
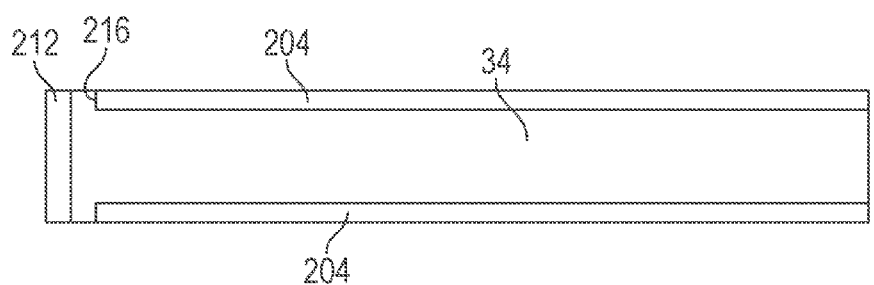
FIG. 23 is a schematic, bottom view of the largest ramp segment.
Figure 24:
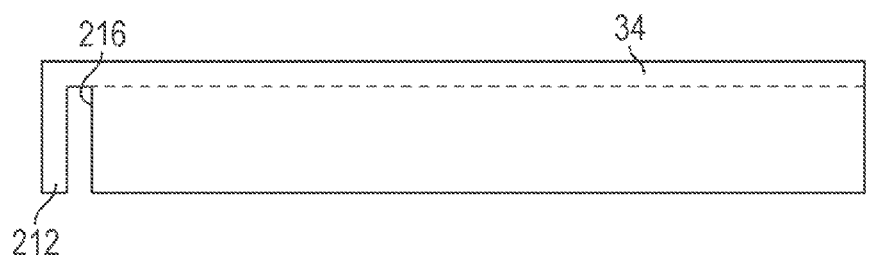
FIG. 24 is a schematic, side view of the largest ramp segment.

With reference to FIGS. 16 and 17, instead of telescoping ramps 32a (and/or 32b), the tailgate assembly 14 may include one or more ramps which fold similar to a carpenters-type folding wood scale 132. As a non-limiting example, the carpenters-type folding ramp 132 includes a plurality of a first folding ramp segment 134, a second folding ramp segment 136, and a third folding ramp segment 138. However, the carpenters-type folding ramp 132 may include more or fewer ramp segments depending on the pickup bed height. The carpenters-type folding ramp 132 includes fasteners 140, such as pivot pins, pivotally connected the first folding ramp segment 134, the second folding ramp segment 136, and the third folding ramp segment 138. For example, one fastener 140 pivotally connects the first folding ramp segment 134 to the second folding ramp segment 136, and another fastener 140 pivotally connects the second folding ramp segment 136 to the third folding ramp segment 138. The fasteners 140 allow the first folding ramp segment 134, the second folding ramp segment 136, and the third folding ramp segment 138 move relative to each other between the extended (or unfolded) position and retracted (or folded) position in the direction indicated by arrows 142.

With reference to FIGS. 18-22, instead of the guide rod 40, the tailgate 30 may have a laterally-extending track 202 to facilitate movement of the telescoping ramps 32a (and/or 32b) along the lateral direction LT (i.e., the cross-car direction). The laterally-extending track 202 is disposed inside the tailgate 30 at the rearmost point of the tailgate 30 when the tailgate 30 is in an open position. The first telescoping segment 34 includes one or more protrusions 204 configured, sized, and shaped to be slidably received in the laterally-extending track 202. The first telescoping segment 34, which is the largest telescoping segment, includes a foot 212 to stop the rear motion against a retention block 210. The retention block 210 may be part of the laterally-extending track 202 and limits the movement of the telescoping ramps 32a (and/or 32b) along the longitudinal direction. In addition, the first telescoping segment 32 defines a slot 216 to facilitate lateral adjustment. The laterally-extending track 202 is defined by a plurality of track walls 206. One of the track walls 206 and/or the tailgate 30 defines one or more protrusions openings 208 extending longitudinally. The protrusion openings 208 allow the protrusions 204 of the telescoping ramp 32a (and/or 32b) to move inside the laterally-extending track 202 along a longitudinal direction as indicated by arrow S. During operation, the telescoping ramp 32a (or 32b) slides out (in the direction indicated by arrow S) until the foot 212 contacts the retention block 212. Once the protrusions 204 are in the laterally-extending track 202, the telescoping ramp 32a (or 32b) can move along the lateral direction.

While the best modes for carrying out the teachings have been described in detail, those familiar with the art to which this disclosure relates will recognize various alternative designs and embodiments for practicing the teachings within the scope of the appended claims. The tailgate assembly and vehicle illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A tailgate assembly, comprising:
a tailgate;
a telescoping ramp movably coupled to the tailgate, wherein the telescoping ramp is movable relative to the tailgate between a fully retracted position and a fully extended position;
wherein, in the fully retracted position, the telescoping ramp is entirely disposed inside the tailgate; and
wherein, in the fully extended position, the telescoping ramp is at least partly disposed outside the tailgate;
a door movably coupled to the tailgate such that the door is movable relative to the tailgate between a closed position and an open position, wherein, when the door is in the open position, the telescoping ramp is accessible; and
a locking assembly coupled to the door, wherein the locking assembly is configured to lock the door relative to the tailgate in the closed position, the locking assembly includes a tab movably coupled to the door such that the tab is movable relative to the door between a locked position and an unlocked position.

2. A tailgate assembly, comprising:
a tailgate;
a telescoping ramp movably coupled to the tailgate, wherein the telescoping ramp is movable relative to the tailgate between a fully retracted position and a fully extended position;
wherein, in the fully retracted position, the telescoping ramp is entirely disposed inside the tailgate; and
wherein, in the fully extended position, the telescoping ramp is at least partly disposed outside the tailgate; and
a bump coupled to the tailgate and a ramp hook coupled to the telescoping ramp, wherein the ramp hook is configured to engage the bump when the telescoping ramp is outside the tailgate, the tailgate further includes a track to allow longitudinal movement of the telescoping ramp, the telescoping ramp is configured to be fully removed from the tailgate, and the ramp hook is configured to be mounted on the bump to couple the telescoping ramp to the tailgate.

3. The tailgate assembly of claim 2, wherein the telescoping ramp includes a first telescoping segment, a second telescoping segment, and a third telescoping segment, the second telescoping segment is slidably coupled to the first telescoping segment, and the third telescoping segment is slidably coupled to the second telescoping segment.

4. The tailgate assembly of claim 3, further comprising a guide rod coupled to the tailgate, wherein the telescoping ramp is movably coupled to the guide rod to allow the telescoping ramp to move relative to the tailgate along a lateral direction.

5. The tailgate assembly of claim 4, wherein the second telescoping segment is movably coupled to the first telescoping segment to allow the second telescoping segment to move relative to the first telescoping segment along a longitudinal direction, and the longitudinal direction is perpendicular to the lateral direction.

6. The tailgate assembly of claim 5, wherein the tailgate defines an inner tailgate cavity, the tailgate assembly further comprises a track disposed inside the inner tailgate cavity, and the track extends along the longitudinal direction.

7. The tailgate assembly of claim 6, further comprising a guide roller coupled to the guide rod, wherein the guide roller is sized to be movably disposed in the track to allow the guide rod to move along the longitudinal direction, the telescoping ramp defines a rod-receiving opening partially receiving the guide rod, and the guide rod is slidably disposed in the rod-receiving opening to allow the telescoping ramp to move in a lateral direction.

8. The tailgate assembly of claim 2, further comprising a door movably coupled to the tailgate such that the door is movable relative to the tailgate between a closed position and an open position, wherein, when the door is the open position, the telescoping ramp is accessible.

9. The tailgate assembly of claim 8, wherein the door defines a slot, and the tailgate assembly further includes a ramp hook coupled to the telescoping ramp, and the ramp hook is sized to be received in the slot, the tailgate further includes a track to allow longitudinal movement of the telescoping ramp, the telescoping ramp is configured to be fully removed from the tailgate, and the slot is configured to receive the ramp hook to couple the telescoping ramp to the tailgate.

10. A vehicle, comprising:
a truck bed;
a tailgate assembly coupled to the truck bed, wherein the tailgate assembly includes:
a tailgate movably coupled to the truck bed;
a telescoping ramp movably coupled to the tailgate, wherein the telescoping ramp is movable relative to the tailgate between a fully retracted position and a fully extended position;
wherein, in the fully retracted position, the telescoping ramp is entirely disposed inside the tailgate; and
wherein, in the fully extended position, the telescoping ramp is at least partly disposed outside the tailgate; and
a laterally-extending track disposed at a rearmost point of the tailgate when the tailgate is in an open position, the telescoping ramp has at least one protrusion, the tailgate defines at least one protrusion opening extending longitudinally to allow the telescoping ramp to move along a longitudinal direction, and the laterally-extending track includes a retention block to limit the movement of the telescoping ramp along the longitudinal direction.

11. The vehicle of claim 10, wherein the tailgate is pivotally coupled to the truck bed such that the tailgate is pivotable about a first pivot axis, and the vehicle further includes a hinge assembly coupled between the truck bed and the tailgate to allow the tailgate to pivot relative to the truck bed about a second pivot axis, and the second pivot axis is spaced apart from the first pivot axis along a longitudinal direction.

12. The vehicle of claim 11, wherein the hinge assembly includes a bar coupled between the truck bed and the tailgate, a first pivot pin directly coupling the bar to the truck bed, and a second pivot pin directly coupling the bar to the tailgate.

13. The vehicle of claim 12, wherein the hinge assembly further includes a catch directly coupled to the tailgate, and the catch defines an open cavity sized to receive the bar.

14. The vehicle of claim 13, wherein the hinge assembly further includes a locking pin removably coupled to the catch and the bar.

15. The vehicle of claim 14, wherein the catch defines a catch hole sized to receive the locking pin.

16. The vehicle of claim 15, wherein the tailgate is movable along the longitudinal direction when the locking pin is decoupled from the catch and the bar.

17. The vehicle of claim 15, wherein the tailgate is pivotable about the second pivot axis when the locking pin is decoupled from the catch and the bar.

18. The vehicle of claim 10, wherein the telescoping ramp includes a first telescoping segment, a second telescoping segment, and a third telescoping segment, the second telescoping segment is slidably coupled to the first telescoping segment, the third telescoping segment is slidably coupled to the second telescoping segment, the tailgate assembly includes a guide rod coupled to the tailgate, the telescoping ramp is movably coupled to the guide rod to allow the telescoping ramp to move relative to the tailgate along a lateral direction, the first telescoping segment defines a rod-receiving opening, the rod-receiving opening receives the guide rod, the second telescoping segment is movably coupled to the first telescoping segment to allow the second telescoping segment to move relative to the first telescoping segment along a longitudinal direction, the longitudinal direction is perpendicular to the lateral direction, the tailgate defines an inner tailgate cavity, the tailgate assembly further includes a track disposed inside the inner tailgate cavity, the track extends along the longitudinal direction, the tailgate assembly further includes a guide roller coupled to the guide rod, the guide roller is sized to be movably disposed in the track to allow the guide rod to move along the longitudinal direction, the tailgate assembly further includes a door movably coupled to the tailgate such that the door is pivotally relative to the tailgate between a closed position and an open position, the telescoping ramp is accessible when the door is the open position, the tailgate assembly further includes a locking assembly coupled to the door, the locking assembly is configured to lock the door relative to the tailgate in the closed position, the locking assembly includes a tab movably coupled to the door such that the tab is movable relative to the door between a locked position and an unlocked position, the tailgate is pivotally coupled to the truck bed such that the tailgate is pivotable about a first pivot axis, the vehicle further includes a hinge assembly coupled between the truck bed and the tailgate to allow the tailgate to pivot relative to the truck bed about a second pivot axis, the second pivot axis is spaced apart from the first pivot axis along the longitudinal direction, the hinge assembly includes a bar coupled between the truck bed and the tailgate, the hinge assembly includes a first pivot pin directly coupling the bar to the truck bed, the hinge assembly includes a second pivot pin directly coupling the bar to the tailgate, the hinge assembly includes a catch directly coupled to the tailgate, the catch defines an open cavity sized to receive the bar, the hinge assembly includes a locking pin removably coupled to the catch and the bar, the catch defines a catch hole sized to receive the locking pin, the bar defines a bar hole, the bar hole and the catch hole are substantially aligned with one another to receive the locking pin when the bar is partly disposed in the open cavity of the catch, the tailgate is movable relative to the truck bed in the longitudinal direction only when the locking pin is decoupled from the catch and the bar, and the tailgate is pivotable about the second pivot axis only when the locking pin is decoupled from the catch and the bar.

* * * * *